United States Patent [19]
Savage

[11] Patent Number: 5,978,237
[45] Date of Patent: Nov. 2, 1999

[54] POWER RECOVERY SYSTEM

[75] Inventor: Samuel Edward Savage, Jamesburg, N.J.

[73] Assignee: Lucent Technologies Inc., Murray Hill, N.J.

[21] Appl. No.: 09/168,997

[22] Filed: Oct. 9, 1998

[51] Int. Cl.[6] ........................... H02M 1/12; H02M 7/125
[52] U.S. Cl. .................... 363/49; 363/52; 307/9
[58] Field of Search ............................... 363/49, 52, 100; 307/115, 125, 139, 85, 87, 119, 64, 66

[56] References Cited

U.S. PATENT DOCUMENTS 4,307,300  12/1981  Kisami .......................... 307/9
5,642,100  6/1997  Farmer .
5,712,779  1/1998  Sheppard et al. .

*Primary Examiner*—Peter S. Wong
*Assistant Examiner*—Rajnikant B. Patel

[57] ABSTRACT

A power system recovery design which protects the integrity of an electronic controller system by inhibiting application of DC electric power to heavy load equipment until a user determines that application of DC electric power should be reinitiated. Once heavy load equipment has been placed in an inoperative state, the power system recovery design will maintain the inoperative state until an operator actively reinitiates the operative state.

21 Claims, 2 Drawing Sheets

POWER RECOVERY SYSTEM

BACKGROUND OF THE INVENTION

1. Field of the Invention

The present invention relates to a power recovery system for protecting the integrity of an electronic controller system by inhibiting application of DC electric power to heavy load equipment to which DC electric power was supplied until a user determines that application of DC electric power should be reinitiated.

2. Description of Related Art

Electronic controller system (ESC) power plants are commonly used to supply telecommunications equipment with low voltage direct current (DC) electric power. To obtain DC electric power, ECS power plants typically convert single phase alternating current (AC) electric power supplied by a commercial AC utility transmission system to DC electric power using rectifiers. Unfortunately, commercial AC electric power is subject to frequent interruption. Therefore, in order to maintain reliability, ECS power plants often utilize batteries to supply the loads with DC electric power until AC electric power has been restored.

In conventional ECS power plants, once AC electric power is restored, the rectifiers automatically and immediately resume application of DC electric power to the loads so that service is resumed as soon as possible. However, these conventional designs are prone to load equipment damage caused by in-rush current which frequently occurs when ECS power plants resume application of DC electric power to the loads once AC electric power is restored. In-rush current is an undesired surge of electric current, which may cause extensive damage to the chips, integrated circuits, circuit packs or other types of heavy load equipment connected to the rectifiers. When damaged, this heavy load equipment can require large expenditures of time and money to repair and/or replace.

SUMMARY OF THE INVENTION

The power recovery system of the present invention protects the integrity of an electronic controlled system by inhibiting application of DC electric power to heavy load equipment until a user determines that application of DC electric power should be reinitiated. Namely, once heavy load equipment has been placed in an inoperative state, the power recovery system will maintain the inoperative state until an operator actively reinitiates the operative state.

When AC electric power has been interrupted, the rectifiers will not automatically and immediately supply DC electric power to the heavy load equipment as soon as AC electric power has been restored. Rather, upon restoration of AC electric power, an operator is notified. If the operator determines that conditions are favorable and proper protective measures have been taken, the operator actively reinitiates application of DC electric power to the heavy load equipment. Until the heavy load equipment is actively conditioned by the operator, the heavy load equipment does not receive DC electric power even though the heavy load equipment and rectifiers are connected to an operating AC electric power source.

DETAILED DESCRIPTION OF THE INVENTION

A detailed description of the structure and operation of the present invention will be given below with reference to the figures.

Figure 1:
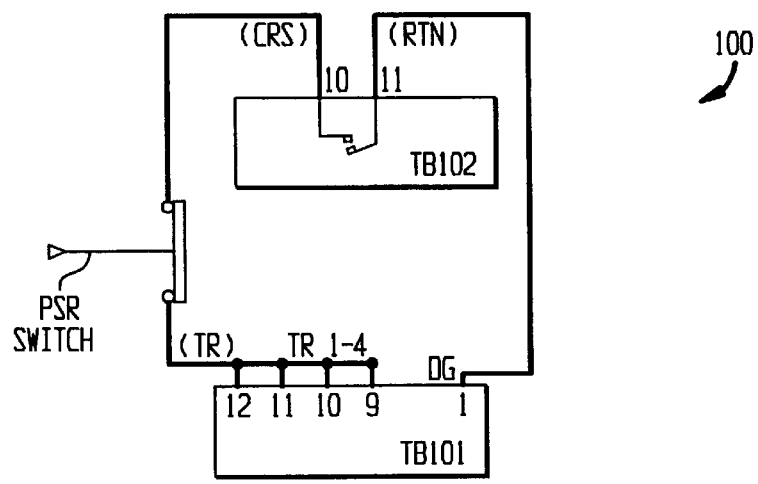
FIG. 1 is a circuit diagram of a first embodiment of the present invention showing the power system recovery circuit in a normal operating state.

FIG. 1 illustrates a circuit diagram of a first embodiment of the present invention showing the power system recovery circuit 100 in a normal operating state. As shown in FIG. 1, first and second terminal blocks TB101 and TB102 are connected to each other by a normally closed power system recovery (PSR) push button switch. A closure on release state (CRS) contact at terminal 10 on the terminal block TB102 is connected through the normally closed PSR push button switch to transfer rectifier (TR) contacts at terminals 9, 10, 11 and 12 on terminal block TB101. A return (RTN) contact at terminal 11 of the terminal block TB102 is hard wired to a discharge ground contact (DG) at terminal 1 of the terminal block TB101. Thus, the return contact continuously receives a low signal.

The transfer rectifier (TR) contacts control the operating state of corresponding rectifiers (not shown). When in the ON state, these rectifiers are connected to an AC electric power source and convert AC electric power to DC electric power which may be supplied to heavy load equipment. In the area of telecommunications, circuit packs are one example of heavy load equipment.

In FIG. 1, the closure on release state (CRS) contact and the return (RTN) contact are in the open state. When in the open state, the rectifiers are in the ON state and supply DC electric power to the heavy load equipment. When the heavy load equipment is transferred to a release (inoperative) state, such as when commercial AC electric power has been interrupted, contact is made between the closure on release state (CRS) contact and the return (RTN) contact, as shown in FIG. 2.

Figure 2:
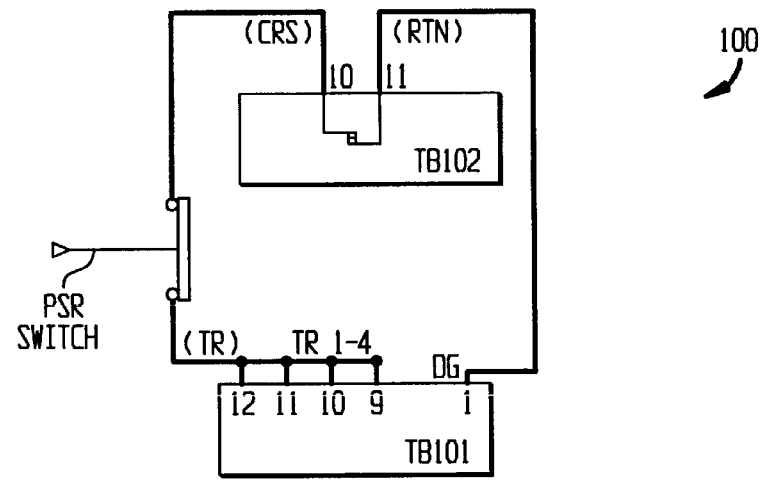
FIG. 2 is a circuit diagram of the first embodiment of the present invention showing the power system recovery circuit in a power down state.

FIG. 2 illustrates a circuit diagram of the first embodiment of the present invention showing the power system recovery circuit 100 in a power down state. When the closure on release state (CRS) contact and the return (RTN) contact are in the closed state, the closure on release state (CRS) contact at terminal 10 of terminal block TB102 receives the low signal from the return (RTN) contact at terminal 11 of terminal block TB102. The low signal is transmitted through the closed PSR push button switch to the transfer rectifier (TR) contacts at terminals 9, 10, 11 and 12 of terminal block TB101. When the transfer rectifier (TR) contacts receive the low signal, the operating state of the corresponding rectifiers is transferred to the OFF state. As long as the transfer rectifier (TR) contacts receive the low signal, the rectifiers are maintained in the OFF state and no DC electric power is supplied to the heavy load equipment. When an operator desires to supply the loads with DC electric power, the operator must actively open PSR push button switch, as shown in FIG. 3.

Figure 3:
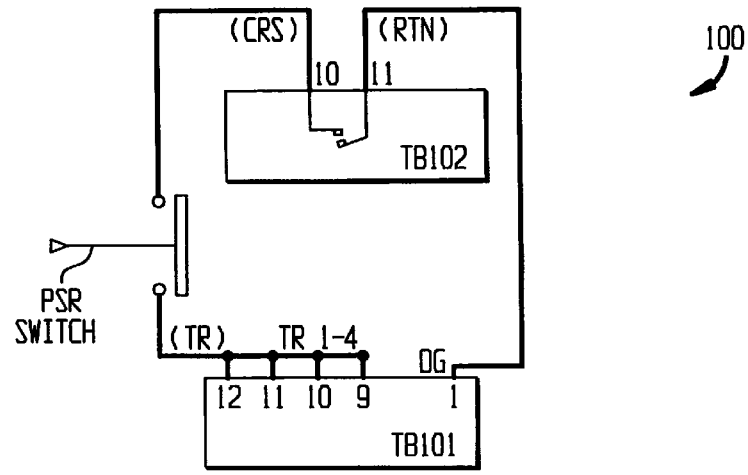
FIG. 3 is a circuit diagram of the first embodiment of the present invention showing the power system recovery circuit in a restore state.

FIG. 3 is a circuit diagram of the first embodiment of the present invention showing the power system recovery circuit 100 in a restore state. Once the operator opens the PSR push button switch, the closure on release state (CRS) contact and the transfer rectifier (TR) contacts are in the open state. The closure on release state (CRS) contact and the return (RTN) contact are also transferred to the open state. When the contacts are in the open state, the low signal is no longer transmitted to the transfer rectifier (TR) contacts and the corresponding rectifiers are transferred to the ON state. When in the ON state, the rectifiers are free to supply DC electric power to the heavy load equipment.

Figure 4:
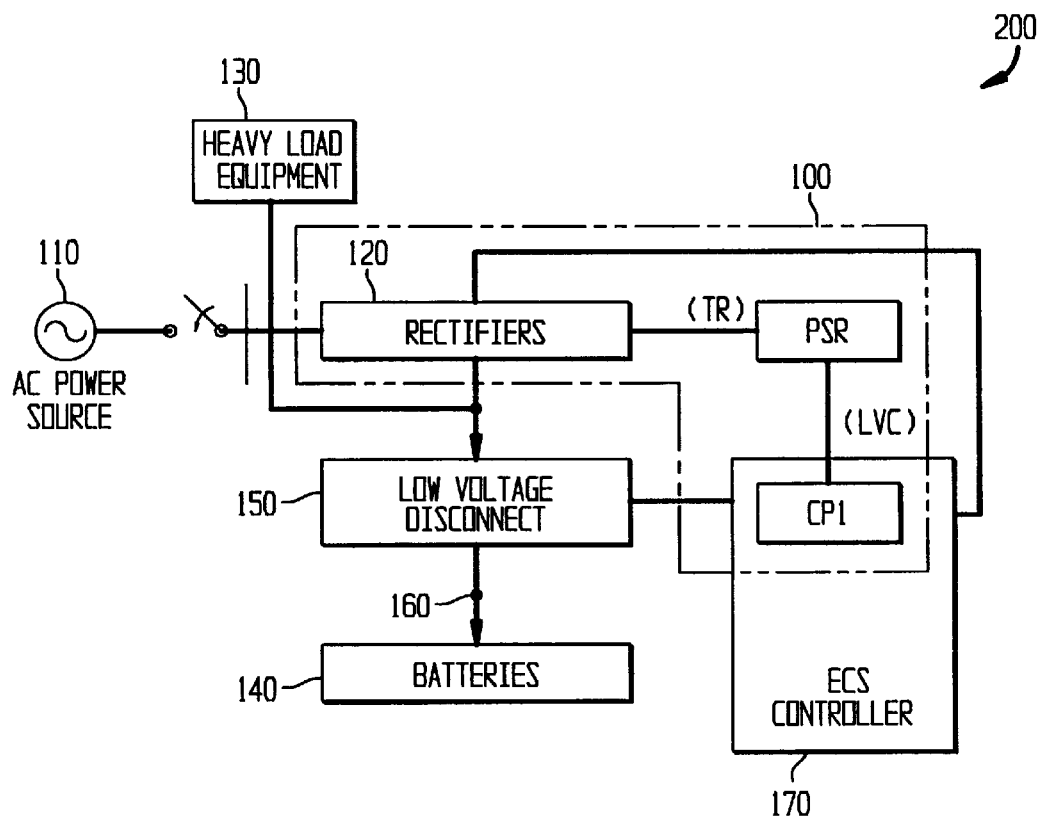
FIG. 4 is a block schematic of a power recovery system utilizing the power system recovery circuit of the present invention.

FIG. 4 illustrates a block schematic of a power recovery system 200 utilizing the power system recovery circuit 100 of the present invention. As shown in FIG. 4, commercial AC electric power is supplied to rectifiers 120 by an AC power source 110. If commercial AC power is interrupted, batteries 140 are utilized to supply DC electric power to the heavy load equipment 130 so that the reliability of the system is maintained. The batteries 140 supply DC electric power through a low voltage disconnect (LVD) device 150 which protects the batteries 140 from possible deep discharge damage by disconnecting the batteries 140 when battery voltage drops below a predetermined threshold voltage. Consequently, the batteries 140 will only supply power to the heavy load equipment 130 so long as the battery voltage does not fall below the predetermined threshold value, e.g. 43.5 V for a 48 V plan.

When the LVD device 150 is released and the batteries 140 are disconnected from the heavy load equipment, power/sense leads 160 located on a battery bus between the LVD device 150 and the batteries 140 detect the condition. In response to the LVD device 150 release, indicators such as light emitting diodes (LEDs) or any other suitable alarm notifies an operator. Such alarms can notify an operator by telephone, pager, or other remote communication device. Because the power/sense leads 160 are located on the battery side of the LVD device 150, the power sense leads 160, LEDs or other alarms are supplied with power by the batteries 140. Therefore, even when the batteries 140 are disconnected from the heavy load equipment by the LVD device 150, the power/sense leads 160, LEDs or other alarms remain operable.

As shown in FIG. 4, the LVD device 150 is connected to an ECS controller 170. When the LVD device 150 release (inoperative state of the heavy load equipment) condition is detected, the low voltage closed (LVC) contact and the low voltage return (LVR) contact of the PSR circuit 10 are transferred to the closed state in the ECS controller 170.

Figure 5:
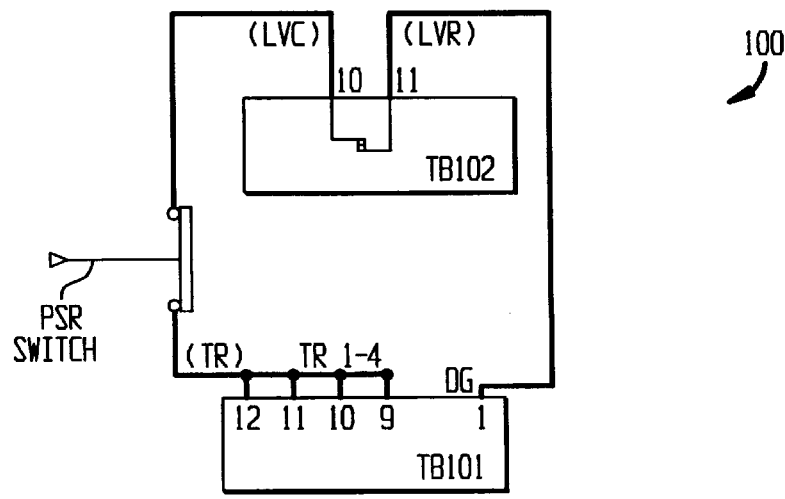
FIG. 5 is a circuit diagram of a second embodiment of the present invention showing the power system recovery circuit in a power down state.

FIG. 5 illustrates a circuit diagram of a second embodiment of the present invention for use in the power recovery system of FIG. 4. As shown in FIG. 5, the first and second terminal blocks TB101 and TB102 are connected to each other by a normally closed power system recovery (PSR) push button switch. A low voltage closed (LVC) contact at terminal 10 on the terminal block TB102 is connected through the normally closed PSR push button switch to transfer rectifier (TR) contacts at terminals 9, 10, 11 and 12 on terminal block TB101. A low voltage return (LVR) contact at terminal 11 of the terminal block TB102 is hard wired to a discharge ground (DG) contact at terminal 1 of the terminal block TB101. Thus, the low voltage return (LVR) contact continuously receives a low signal.

In FIG. 5, the low voltage closed (LVC) contact at terminal 10 of terminal block TB102 and the low voltage return (LVR) contact at terminal 11 of terminal block TB102 have been placed in the closed state. The closed state of the low voltage closed (LVC) and the low voltage return (LVR) contact is in response to the detection of the release state of the LVD device 150. When the LVD device 150 is released, the heavy load equipment is in an inoperative state. In the closed state, the low voltage closed (LVC) contact at terminal 10 of terminal block TB102 receives the low signal from the low voltage return (LVR) contact at terminal 11 of terminal block 102. The low signal is transmitted through the closed PSR push button switch to the transfer rectifier (TR) contacts at terminals 9, 10, 11 and 12 of terminal block TB101.

When the transfer rectifier (TR) contacts receive the low signal, the operating state of the corresponding rectifiers is transferred to the OFF state. As long as the transfer rectifier (TR) contacts receive the low signal, the rectifiers are maintained in the OFF state and no DC electric power is supplied to the heavy load equipment. Therefore, even if commercial AC power is restored, the rectifiers 120 will not supply DC electric power to the heavy load equipment 130 until the PSR push button switch is opened.

Once an operator is notified of the LVD device 150 release, the operator may assess the situation to determine whether DC electric power should be supplied to the heavy load equipment 130 even if commercial AC power has been restored. For example, the operator may decide that application of DC power would result in damage to the heavy load equipment 130 from in-rush current and that further precautions must be taken. Such precautions may entail removing certain circuit packs or inducing gradual recharging of the capacitors in the heavy load equipment.

If commercial AC power is available and the operator has determined that it is safe to apply DC power, the operator pushes PSR push button switch and opens the low voltage closed (LVC) and transfer rectifier (TR) contacts. The low voltage closed (LVC) and low voltage return (LVR) contacts are also returned to the open state. When the contacts are opened, the transfer rectifier (TR) contacts no longer receive the low signal and the rectifiers 120 are transferred to the ON state. When in the ON state, the rectifiers 120 supply DC electric power to the heavy load equipment 130. Once the rectifiers 120 are no longer inhibited and DC electric power is restored to the heavy load equipment 130, the LVD device 150 is returned to the closed state, and the PSR push button switch is returned to its normally closed state. The operator can remotely check and determine whether it is safe to apply DC electric power to the heavy load equipment 130 and can remotely cause the PSR push button switch to open.

The examples discussed above are given by way of illustration only and do not limit the present invention. The power system recovery design of the present invention has applicability in any situation where heavy load equipment and rectifiers are placed in an inoperative state. A low voltage closed (LVC) contact is one example of the various controls or relays that can be used to transfer the heavy load equipment and rectifiers to the inoperative state. Once heavy load equipment has been placed in an inoperative state, the power system recovery design will maintain the inoperative state until an operator actively reinitiates the operative state.

What is claimed is:

1. A power system recovery circuit comprising:
   at least one rectifier supplying electric power to heavy load equipment, said at least one rectifier being transferable between an operative state in which said heavy load equipment is supplied with electric power and an inoperative state in which said heavy load equipment is not supplied with electric power, said at least one rectifier being transferred to the inoperative state upon the occurrence of a predetermined condition; and a normally closed power system recovery switch maintaining said at least one rectifier in the inoperative state upon cessation of said predetermined condition until said at least one rectifier is actively transferred to the operative state.

2. The power system recovery circuit according to claim 1, further including first and second terminal blocks, said first terminal block receiving a control signal from said second terminal block and selectively transmitting said control signal through said power system recovery switch to maintain said at least on rectifier in the inoperative state.

3. The power system recovery circuit according to claim 2, wherein said control signal is a low signal received from a discharge ground contact on said second terminal.

4. The power system recovery circuit according to claim 1, wherein said at least one rectifier is actively transferred to the operative state after opening said normally closed power system recovery switch.

5. A power recovery system comprising:
a power system recovery circuit including,
at least one rectifier supplying electric power to heavy load equipment, said at least one rectifier being transferable between an operative state in which said heavy load equipment is supplied with electric power and an inoperative state in which said heavy load equipment is not supplied with electric power, said at least one rectifier being transferred to the inoperative state upon the occurrence of a predetermined condition, and
a normally closed power system recovery switch maintaining said at least one rectifier in the inoperative state upon cessation of said predetermined condition until the at least one rectifier is actively transferred to the operative state,
wherein said at least one rectifier receives AC electric power, converts the AC electric power and supplies DC electric power to the heavy load equipment.

6. The power recovery system according to claim 5, further including at least one battery connected to said heavy load equipment for supplying said heavy load equipment with DC electric power upon interruption of the AC electric power.

7. The power recovery system according to claim 6, further including a low voltage disconnect connected between said at least one battery and said heavy load equipment, said low voltage disconnect opening to disconnect said at least one battery from said heavy load equipment when voltage of said at least one battery falls below a threshold voltage.

8. The power recovery system according to claim 7, wherein said predetermined condition is the opening of said low voltage disconnect.

9. The power recovery system according to claim 7, further including power/sense leads on a connection between said low voltage disconnect and said batteries, said power/sense leads being supplied with power from said at least one battery when said low voltage disconnect is open.

10. The power recovery system according to claim 5, wherein said at least one rectifier is actively transferred to the operative state after opening said normally closed power system recovery switch.

11. A power recovery system, comprising:
a power system recovery circuit including, at least one rectifier supplying electric power to heavy load equipment, said at least one rectifier being transferable between an operative state in which said heavy load equipment is supplied with electric power and an inoperative state in which said heavy load equipment is not supplied with electric power, said at least one rectifier being transferred to the inoperative state upon the occurrence of a predetermined condition, and
a power system recovery switch maintaining said at least one rectifier in the inoperative state upon cessation of said predetermined condition until the at least one rectifier is actively transferred to the operative state, wherein said at least one rectifier receives AC electric power, converts the AC electric power and supplies DC electric power to the heavy load equipment;
at least one battery connected to said heavy load equipment for supplying said heavy load equipment with DC electric power upon interruption of the AC electric power;
a low voltage disconnect connected between said at least one battery and said heavy load equipment, said low voltage disconnect opening to disconnect said at least one battery from said heavy load equipment when voltage of said at least one battery falls below a threshold voltage; and
power/sense leads on a connection between said low voltage disconnect and said batteries, said power/sense leads being supplied with power from said at least one battery when said low voltage disconnect is open, wherein said power/sense leads transmit a signal indicating that said at least one rectifier is in the inoperative state.

12. A method of power system recovery comprising the steps of:
supplying electric power to heavy load equipment using at least one rectifier, the at least one rectifier being transferable between an operative state in which the heavy load equipment is supplied with electric power and an inoperative state in which the heavy load equipment is not supplied with electric power;
transferring the at least one rectifier to the inoperative state upon the occurrence of a predetermined condition; and
maintaining the at least one rectifier in the inoperative state upon cessation of the predetermined condition using a normally closed power system recovery switch until the at least one rectifier is actively transferred to the operative state.

13. The method of power system recovery according to claim 11, wherein the at least one rectifier is maintained in the inoperative state using first and second terminal blocks, the first terminal block receiving a control signal from the second terminal block and selectively transmitting the control signal through a power system recovery switch to maintain the at least on rectifier in the inoperative state.

14. The method of power system recovery according to claim 13, wherein the control signal is a low signal received from a discharge ground contact on the second terminal.

15. The method of power system recovery according to claim 11, further including the steps of:
supplying the at least one rectifier with AC electric power; and
supplying DC electric power to the heavy load equipment connected to the at least one rectifier.

16. The method of power recovery according to claim 15, further including the step of supplying the heavy load equipment with DC electric power upon interruption of the AC electric power using at least one battery connected to the heavy load equipment.

17. The method of power recovery according to claim 16, further including the step of disconnecting the at least one battery from the heavy load equipment using a low voltage disconnect when voltage of the at least one battery falls below a threshold voltage.

18. The method of power recovery according to claim 17, wherein the predetermined condition is said disconnecting step.

19. The method of power recovery according to claim 17, further including the step of detecting the disconnecting of the at least one battery from the heavy load equipment using power/sense leads on a connection between the low voltage disconnect and the at least one battery, the power/sense leads being supplied with power from the at least one battery when the low voltage disconnect disconnects the at least one battery from the heavy load equipment.

20. The power recovery circuit according to claim 19, further including the step of transmitting a signal to an operator indicating that the at least one rectifier is in the inoperative state using the power/sense leads.

21. The method of power system recovery according to claim 12, wherein said at least one rectifier is actively transferred to the operative state after opening said normally closed power system recovery switch.

* * * * *